L. REISFELD.
MACHINE FOR FILLING AND LINKING SAUSAGES.
APPLICATION FILED JUNE 5, 1917.

1,292,645.

Patented Jan. 28, 1919.
4 SHEETS—SHEET 2.

Witness:
C. Burnap

Inventor:
Louis Reisfeld
By Sheridan, Scott & Sheridan, Attys

UNITED STATES PATENT OFFICE.

LOUIS REISFELD, OF CHICAGO, ILLINOIS, ASSIGNOR OF ONE-THIRD TO CHRIST F. NORAGER, OF McHENRY, ILLINOIS.

MACHINE FOR FILLING AND LINKING SAUSAGES.

1,292,645.     Specification of Letters Patent.     Patented Jan. 28, 1919.

Application filed June 5, 1917. Serial No. 172,918.

*To all whom it may concern:*

Be it known that I, LOUIS REISFELD, a subject of the King of Hungary, residing at Chicago, in the county of Cook and State of Illinois, have invented certain new and useful Improvements in Machines for Filling and Linking Sausages, of which the following is a specification.

This invention relates to improvements in methods of filling and linking sausages and in sausage-filling and linking machines, and its purpose is to provide an improved process and apparatus for automatically forming link sausages.

The principal object of the invention is to provide means for filling a sausage casing and forming links of equal length. A further object is to provide improved means for intermittently filling successive sections of a sausage casing and alternately twirling the casing adjacent the last section filled, in order to form a permanent separation between successive links formed by the machine.

In one type of sausage-linking machines heretofore used, the machine operates upon a long link of stuffed casing which has previously been filled, but in this class of machines the sudden application of pressure to constrict the stuffed casing, or the subsequent twirling of adjacent links without providing sufficient slack in the casing between them causes the casing to be torn. In this class of machines the links were of equal length, but the casings of a large proportion of the links were torn. In the other class of machines the casing is filled in one operation to form a single link, and the adjacent casing is then twirled with respect to the link in order to form a permanent separation between the link and the next one to be formed; but in this class of machine as heretofore constructed there has been no uniformity in length of the links formed, because of the irregularity in cross section of the casing whereby equal quantities of meat fed into the casing were adapted to form links of various different lengths, depending upon the cross section of the casing. It is desirable that the various links of a sausage have substantially the same length, not only because of the more pleasing appearance and consequent attractiveness to the purchasing public, but because of the fact that link sausages are commonly used for forming sandwiches, and when used for this purpose it is important that the links all have a particular size to conform to the size of the bread or other material of which the sandwich is made. The means whereby the present invention provides links of equal length is therefore one of the important features of the device.

In the formation of link sausages by the present invention equal lengths of the casing are filled successively under pressure, so that the filling of one length or section automatically advances the sections which have been filled in preceding operations, and means is provided whereby the length of the sections filled is automatically measured, so that when the last section of the casing has been filled to a given length the feeding or filling operation automatically ceases, and twirling apparatus is put in operation for rotating the unfilled casing adjacent the last section filled about its longitudinal axis, thereby forming a permanent separation between the last section or link and the next succeeding one to be formed. At the conclusion of the twirling operation the twirling means is automatically arrested, and the feeding means is again put in operation to fill a new section of the casing adjacent the one which has just been separated from the unfilled casing by the twirling operation. Another object of the invention is to provide means for automatically controlling the succession of the different functions performed by the machine, and for insuring the formation of perfect links of equal length without tearing or otherwise injuring the sausage casing. Another object is to provide electrically actuated means for setting the twirling means in operation after a predetermined section of sausage casing has been filled. Still another object is to provide means for automatically arresting the twirling operation after a predetermined action thereof. Another important object is to provide means for automatically timing successive filling and twirling operations. Other objects relate to various features of construction and arrangement, and to various devices for controlling the operation of the machine, as will appear more fully hereinafter.

Various features and advantages of the invention will appear more clearly from the following specification taken in connection with the accompanying drawings, in which one embodiment of the invention is illustrated.

The invention comprises a main frame 16 and a supplementary frame 15, each adapted to rest upon and be secured to a supporting table 14. The table 16 is provided at its upper central part with a hub or bearing portion 16ᵃ adapted to receive the tubular part 17ᵃ of the feeding tube or nozzle 17. The threaded extremity of this tubular part engages a valve 18 having an operating handle 19, and this valve is in turn connected, through a coupling 20, with a hand valve 21 having an operating handle 21ᵃ. The valve 21 communicates, through a coupling tube 22, with the outlet 23 of the meat-feeding cylinder 24, having a plunger 25 mounted therein connected to an operating piston 26.

The chopped meat to be fed into the sausage casing is placed in the cylinder 24 beneath the piston 25, and when the valves 18 and 21 are open, the downward movement of the piston—which is under constant pressure—by suitable means not herein described, causes the chopped meat to pass outwardly through the tube or nozzle 17. This tube, which is held in a stationary position in the sub-frame by means of a set screw 27, has rotatably mounted thereon a tube 30, the enlarged extremity 30ᵃ of which is adapted to abut against the shoulder 17ᵇ at the junction of the nozzle portion of the tube 17 and the portion 17ᵃ thereof. The enlarged part 30ᵃ of the tube 30 carries a projecting annular flange 31, which extends around the part 17ᵃ of the tube 17, and which is beveled on its outer surface 31ᵃ to form a tight frictional engagement with the correspondingly inclined inner surface on the cylindrical part 32 projecting from the pinion 33, which is rotatably mounted upon the tubular part 17ᵃ. By means of this friction clutch a driving connection is formed between the pinion 33 and the tube 30, and this pinion is adapted to be driven by a gear 34 fixed on a shaft 35 journaled in the frame member 16 and carrying at its opposite end a bevel pinion 36 which is adapted to mesh with the bevel gear 37 mounted on the cam shaft 38. This cam shaft is in turn journaled in bearings 39 carried by the side frame members 16ᵇ of the sub-frame 16. The means by which the cam shaft is driven will be more fully described hereinafter.

The rotatable tube 30, mounted on the tube 17, is adapted to enter and support the sausage casing 40, the unfilled portion of which is folded or compressed on the tube, as shown at 41, so that a relatively large length of unfilled casing can be supported on the tube to be filled by the operation of the feeding mechanism. The outer end of the tube 17 is enlarged, as shown at 17ᶜ, to fit closely the inner wall of the tube, so that the meat passing outwardly through said tube into the casing cannot enter the space between this tube and the tube 30, while at the same time the friction between the tubes 17 and 30 is reduced to a minimum, since they are not connected, except at their ends.

To prevent the casing from slipping on the tube 30 when the same is rotated, a tube 42 is detachably mounted on the part 30ᵃ of said tube by means of tongue and groove connections 43, which permit the tube 42 to be moved endwise with respect to the tube 30; but the tube 42 is normally retained against such endwise movement by means of springs 44 having inwardly turned projecting ends 44ᵃ adapted to engage an annular groove 45 formed on the outer surface of the sleeve 42. Springs 46 are secured to the tube 42, and carry at their ends contact plates 47, which may be formed of rubber, or the like, and which are adapted to engage the casing and hold the same in contact with the end portion of the tube 30. These contact plates are grooved longitudinally of said tube, as shown, so that the grooves prevent rotation of the casing with respect to the tube, while permitting endwise movement thereon, which is necessary in order to permit successive portions of the unfilled casing to slide off the tube 30 as the casing is filled by the passage of meat through the nozzle 17.

As the links are formed on the guideway 48 they pass therefrom on to a chute 49, carried by the supplementary frame 15, through which they pass to a suitable collecting vessel. The guideway is provided with a plurality of longitudinally extending grooves 48ª, which prevent rotation of the sausage links 50 thereon. The link 50 next adjacent the last link filled by the feeding device is held downwardly on the guideway 48 by means of a spring 51, having a contact plate 51ª, of rubber or the like, engaging the upper surface of the link. As the sausage links are formed by the filling of the casing, the casing will be forced off the tube 30, and, assuming that the twirling operation has previously operated in a manner hereinafter to be described, the casing will be filled until a constricted portion of the casing 52, between successive links, arrives at a point beneath the plate 51ª, when a spring-actuated controlling or measuring finger 53 moves upwardly through a slot 54 in the guideway and engages the depression 52. This movement of the finger serves, through suitable mechanism, to arrest the operation of the feeding mechanism, so that the length of the casing filled during each operation of the feeding means is determined by the position of the finger 53 with respect to the end of the nozzle 17.

The measuring finger 53 carries a roller 53ª to coact with the filled sausage casing, and the stem of this finger is slidably mounted in a part 55 of the subframe 56, which is adjustably mounted on the frame 15. The lower end of the finger 53 carries a pivot pin 57 mounted in an elongated slot 58 formed in the end of a lever 59, which is fulcrumed at an intermediate point on an arm 60 carried by the sub-frame 56. The other end of this lever is connected to a coiled spring 61 which has its other end attached to the sub-frame, so that the spring tends normally to move the roller 53ª into engagement with the sausage casing. An actuating pin 62 is pivotally connected at 63 to the lever 59 between the arm 60 and the spring 61, this pin being slidably mounted in an arm 64 carried by the sub-frame 56. The lower end of the pin engages the upper side of a contact spring 65, which is secured to and insulated from the sub-frame at the point 66. This spring carries at an intermediate point an adjustable contact 67, which, when the spring is moved downwardly, is adapted to engage the contact plate 68, mounted on and insulated from the arm 69 of the sub-frame. It will be apparent that when the finger 53 is moved upwardly into the space formed by the constricted part 52 of the sausage casing the actuating pin 62 moves downwardly, causing the contact 67 to engage the contact plate 68, so that an electrical connection is thus established between the conductors 70 and 71. The conductor 70 is connected to one line of the supply main 72 leading from a suitable source of electrical energy, and the other conductor 71 is connected to one terminal of a solenoid 73 mounted on the table 15. The other terminal of this solenoid is connected, through a conductor 74, to the other line of the supply main 72. When the circuit is established through the solenoid the magnetic force exerted thereby on the magnetic core 75 thereof causes the latter to move to the right, as viewed in Fig. 1, so that the extension 75ª thereof slides in its bearing 76 and imparts a corresponding movement to the block 77 fixed thereon. This block carries a pin 78, which engages a slot in the lower arm 80ª of an actuating lever 80 loosely mounted on the driving shaft 81, which is journaled in suitable bearings 82 carried by the frame members 16ᵇ. The shaft 81 is driven from a suitable source of power through a pulley 83 fixed on the projecting end thereof, and this shaft has fixed thereon a driving gear 85, arranged to mesh with an idler gear 86, mounted on a stub shaft 87 carried by the upwardly projecting arm 80ᵇ of the lever 80. When the core of the solenoid moves to the right, as previously described, the gear 86 is moved into mesh with the pinion 88 fixed on the cam shaft 38. The cam shaft is then actuated to drive the gear 37 and pinion 36, thus actuating the gear 34 and pinion 33, so that the tube 30 is rotated, and rotation imparted to that portion of the unfilled sausage casing next adjacent the part thereof which has just been filled with meat.

Before this twirling operation begins the feeding mechanism will have been arrested by the operation of a cam 90, which is fixed on the shaft 38, and which is provided at diametrically opposite points with depressions 91, either one of which is adapted to receive the roller 92 carried by the arm 93ª of the feed control lever 93, during the period when the feeding mechanism is in operation. The roller 92 is normally maintained in contact with the periphery of the cam 90 by means of a coiled spring 94 connected to the lever 93 and to the sub-frame 16. The upper end of this lever is provided with an elongated slot 95, adapted to engage a pin 96 mounted on the actuating arm 19 of the valve 18, by which the flow of meat through the tube 17 is controlled. As soon as the operation of the shaft 38 begins the roller 92 is moved outwardly to coact with the circular portion of the periphery of the cam 90, thus causing the upper end of the lever 93 to move to the right, as viewed in Figs. 1 and 7, thereby closing the valve 18 and shutting off the meat supply. After the meat supply has been shut off the twirling operation begins, and relative rotation is imparted to adjacent sections of the sausage casing during the period when the sausage casing has no longitudinal movement.

Figures 7, 8, 9:
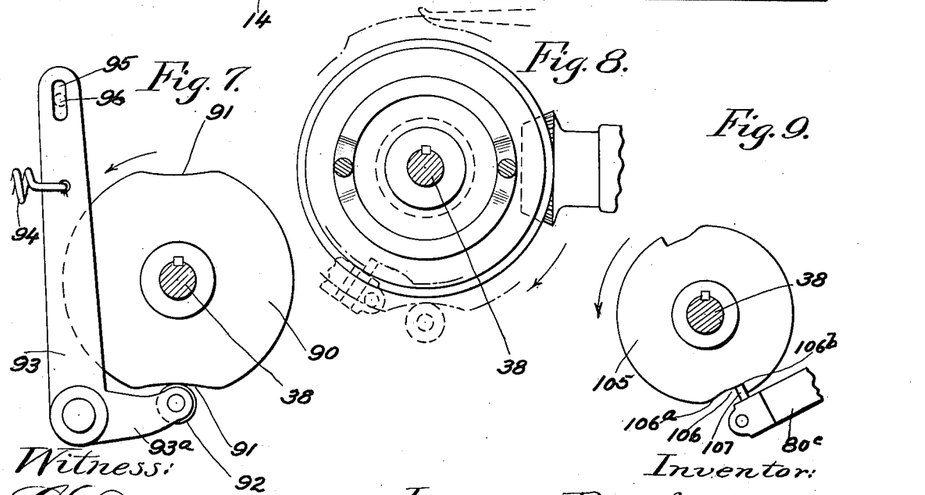
Fig. 7 is a sectional view, taken on the line 7—7 of Fig. 3, showing an enlarged detail view of the cam and associated parts for controlling the feeding mechanism.
Fig. 8 is a sectional view, taken on the line 8—8 of Fig. 3, showing the cam and associated parts for regulating the driving connection between the cam shaft and the twirling mechanism.
Fig. 9 is a sectional view, taken on the line 9—9 of Fig. 3, showing the cam and associated parts by which the operation of the feeding means is controlled.

Unless means be provided for securing an interval of time between the closing of the valve 18 and the beginning of the twirling operation, the twisting of the casing would begin simultaneously with the cutting off of the meat supply, and thus give a gradually diminishing cross section to the twisted part of the sausage and elongate this twisted part, so that a considerable part of the casing would be wasted, especially if the casing is not brought entirely to rest before the twirling operation begins. To avoid this undesirable result, means is provided for delaying the commencement of the twirling operation for a certain period of time after the valve 18 is closed to discontinue the feeding of the meat. This interval of time permits the meat supply to be entirely closed, and permits the previously moving sausage casing to lose its momentum entirely before the twirling operation begins. The means for producing this desirable effect embodies the previously described bevel gear 37, which is formed in two parts, 37$^a$ and 37$^b$. These parts of the gear are provided with teeth 98, and thus form the complementary parts of a jaw clutch. The part 37$^a$, which carries the gear proper, is rotatably mounted on the shaft 38, while the part 37 is slidably keyed thereon and is provided with a circular plate or flange 99, the end face of which forms a cam having depressions 100 at diametrically opposite points. These depressions are located in the path of that portion of the gear which is adapted to coact with the adjustable pins 101 mounted on the part 16$^b$ of the sub-frame, and the cam is normally held in contact with these pins by means of a coil spring 102 which is mounted around the shaft 38 within the cylindrical chambers 103 formed in the parts 37$^a$ and 37$^b$ of the gear. When the cam 99 is moved, however, to a position where the pins 101 move out of the depressions 100 these pins impart a longitudinal movement to the part 37$^b$, and thus cause the teeth 98 on the two parts 37$^a$ and 37$^b$ to mesh with each other and form a driving engagement between the shaft 38 and the part 37$^a$ of the gear. The depressions 100 are somewhat elongated, as shown in Fig. 8 of the drawings, so that before the two parts of the clutch are moved into engagement with each other an interval of time will elapse during which the cam 90 operates to shut off the meat supply, and during which the filled sausage casing has an opportunity to lose its momentum.

In order to insure that the shaft 38 shall stop promptly when one of the notches 91 of the cam 90 is opposite the roller 92, carried by the lever 93, I have provided an additional controlling cam 105, which is keyed on the cam shaft 38 adjacent the gear 88. This cam has two diametrically opposed notches 106, each notch having a sloping wall 106$^a$ at one end, and a shoulder 106$^b$ at the other end. These notches are adapted to be engaged successively by a pin 107 adjustably mounted in the arm 80$^c$ of the lever 80 previously described. This pin is adapted to ride on the periphery of the cam 105 when the shaft 38 and gear 37 are rotating, thus preventing the idler 86 from passing out of mesh with the driving gear 88; but as soon as one of the notches 106 arrives opposite the end 107 the pin will be moved into engagement with the notch by the action of the coil spring 108, which is mounted on the extension 75$^a$ of the magnetic core 75, and retained thereon by the lock nuts 109.

When the pin 107 arrives at a position opposite one of the notches 106 the adjacent radial shoulder 106$^b$ will insure an instantaneous entry of the pin into the notch, thereby stopping the rotation of the shaft 38, and if the notches 106 be located in such positions that one of them is engaged by the pin 107 at the same time that one of the depressions 91 in the cam 90 is engaged by the roller 92, it will be apparent that the shaft 38 will be brought to rest when the valve 18 is open to permit the meat feeding means to operate.

The action of the coiled spring 108, mounted on the extension 75$^a$ of the core of the solenoid, depends upon the electric circuit of the solenoid being open. Although the opening of the valve 18 by the cam 90 causes the meat to feed into the unfilled casing and advance the casing on the guideway 48, thereby depressing the roller 53$^a$ and opening the circuit, it is desirable to provide means for positively opening the circuit during the twirling operation prior to the time when the meat-feeding means is started in its operation by the opening of the valve 18 and prior to the time when one of the notches 106 passes beneath the pin 107, so that the spring 108 will then be free to act to move the gear 86 out of mesh with the gear 88 on the shaft 38. It will be apparent that the circuit may be opened at any time after the initial closing thereof, and the corresponding operation of the solenoid to move the gear 86 into mesh with the gear 88, and after a sufficient movement of the cam 90 to cut off the meat supply, because after this operation has taken place the pin 107, riding on the periphery of the cam 105, prevents the disengagement of the gears 86 and 88 until a complete twirling operation has been performed. I have therefore provided means for positively opening the circuit after the initial closing thereof and prior to the completion of the twirling operation. This means comprises a cam 110, fixed on the end of the shaft 38 adjacent the gear 88, this cam having diametrically opposed projections 110ª. A lever 111, having a grooved extremity 111ª adapted to ride on the periphery of the cam 110, is pivotally mounted on the frame 112, and the other arm 111ᵇ of this lever is pivoted by a slot and pin connection at 113 to a rod 114, which is slidably mounted in bearings 115 carried by the frame 15. A coiled spring 116, mounted on this rod, engages one of these bearings and serves normally to maintain the lever 111 in contact with its cam. The rod 114 is provided with a plurality of holes 117, any one of which is adapted to be detachably engaged by a pin 118, arranged to enter a slot 119 in the end of a bell crank lever 120. This lever is pivoted at 121 on the sub-frame 56, and the other arm thereof has an upturned extremity 122 arranged beneath the end of the contact spring 65, previously described, so that when the rod 114 moves to the left, as viewed in Fig. 1, the extremity 122 of the lever will press upwardly on the contact spring, thereby causing an upward movement of the actuating pin 62 and a corresponding downward movement of the opposite end of the lever 59, to which the roller 53ª is connected. In this way the roller is moved out of the restricted part of the filled sausage casing, and the electric connection between the contacts 67 and 68 is broken by the action of the spring 116 which tends normally to open the circuit. The lever 120 is rendered inoperative during the period which is necessary to permit the operation of the solenoid 73, cam 90, and clutch 37ª—37ᵇ, by the cam 110 having the projections 110ª, one of which engages the lever 111 just prior to the arrival of the constricted portion of the casing above the roller 53ª. The lever 111 continues to ride on one of the projections 110ª until the shaft 138 has rotated to a sufficient degree to insure the continuance of the twirling operation due to the action of the cam 105 even when the circuit of the solenoid is open.

In order to permit the length of the sausage link formed by the machine to be varied as desired, the sub-frame 56, by which the finger 53 and roller 53ª are carried, is mounted on an arm 125, which slidably engages a part 126 of the frame 15, and may be secured in any position longitudinally thereof by means of a set screw 127. The adjustment of this sub-frame will vary the position of the roller 53ª with respect to the outlet 17, and thus vary the length of the sausage casing which must be filled before the circuit of the solenoid is closed to cause the operation of the shaft 38, and consequent cutting off of the meat supply and the beginning of the twirling operation. This adjustability of the sub-frame 56 necessitates a corresponding adjustability of the connection between the lever 120 and the rod 114, which is effected by means of the holes 117 and the pin 118, previously described. The frame member 126, which carries the sub-frame 56, is mounted to swing on the frame 15 about a vertical pivot 128, so that the guideway 28 and the link measuring mechanism may be moved out of alinement with the nozzle 17 to permit ready withdrawal of the tubes 30 and 42 when it is desired to place a casing 41 on the tube 30. The swinging part 126 is held in normal position by a latch 129, which engages a notch 130 in the frame 15. It will be seen that the rod 114 has a pivotal joint 131 which is normally adjacent the pivot 128.

In the operation of this machine the tube 42 is first removed from the tube 30 after disengaging the springs 44 from the annular groove 45, and a suitable length of unfilled sausage casing 41 is placed on the tube 30, being doubled up in the manner shown in the drawings, so that a considerable length of casing can be placed on the tube 30. This operation may be performed with the tube 30 in position on the nozzle 17, but the tube may preferably be removed for this purpose by disengaging the friction clutch by which it is connected to the driving pinion 33 after swinging the guideway 28 and sub-frame 56 out of the way. After the sub-frame 56 has been adjusted to locate the roller 53ª a distance away from the end of the nozzle 17 corresponding to the desired length of sausage link, and after placing the chopped meat in the cylinder 24, the device is in readiness for operation. The casing may be tied or held by the fingers at the beginning of the operation and the roller 53ª held downwardly by manual means until the casing has been filled to such an extent as to move the end of the casing out to the roller. The release of the roller will then close the circuit through the solenoid 73, causing the lever 80 to move the gear 86 into mesh with the gear 88, and thereby actuate the cam shaft 38. The initial operation of the cam shaft will rotate the cam 90, causing the lever 93 to actuate the arm 19 and close the valve 18 to discontinue the flow of meat through the nozzle 17. When the shaft 38 begins to rotate the cam 99 will at first rotate therewith with the pins 101 engaging the depressions 100; but after the valve has been closed and the filled section of the sausage casing has entirely come to rest the projecting portions of the cam 99, between the depressions 100, will engage the pins 101, and thereby cause the clutch member 37ᵇ to engage the part 37ª and establish a driving connection between the shaft 38 and the gear 37. The gear 37 will then actuate the pinion 36, and drive the pinion 33 on the tube 30 through the shaft 35 and gear 34. The twirling operation will then begin, and the section of unfilled casing on the tube 30 will be given a rotation relative to the filled section of casing, and thus form a restricted portion between the unfilled casing and the part filled, thereby forming a link. In the meantime the cam 110 will have actuated the rod 114 to open the circuit of the solenoid 73, so that at the end of the twirling operation the roller 92 on the lever 93 will pass into one of the depressions 91 on the cam 90, thereby opening the valve 18 to permit a further feeding of the meat into the casing, and at the same time the pin 107, which has previously been riding upon the periphery of the cam 105, will pass into one of the notches 106 to cause a positive stopping of the rotation of the shaft 38. This action of the pin 107 is caused by the operation of the lever 80 under the influence of the spring 108, and at the same time the gear 86 is of course passed out of mesh with the gear 88. Simultaneously with this operation the pins 101 will again engage the depressions 100 on the cam 99, and thereby permit the spring 102 to effect a disengagement of the clutch members 37ª and 37ᵇ. The plunger 25 in the cylinder 24 will then continue to force the meat into the sausage casing until the restricted portion formed in the preceding twirling operation arrives at a position above the roller 53ª, whence the circuit of the solenoid 73 is again closed and the operation repeated.

Figure 1:
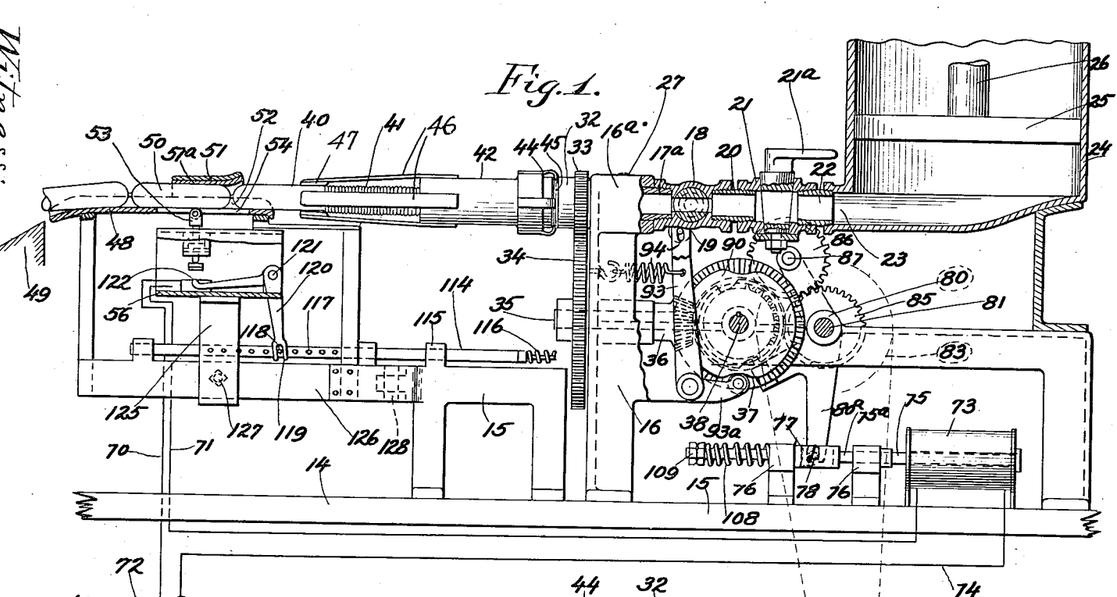
Figure 1 shows a side elevation of the machine with certain parts illustrated in vertical section.
Figure 2:
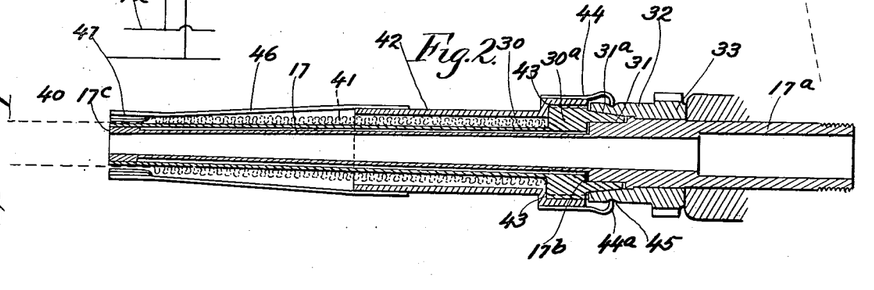
Fig. 2 shows an enlarged longitudinal vertical sectional view of the nozzle of the feeding device by which the unfilled casing is held, and through which the meat is fed into successive links of casing.
Figures 3, 4:
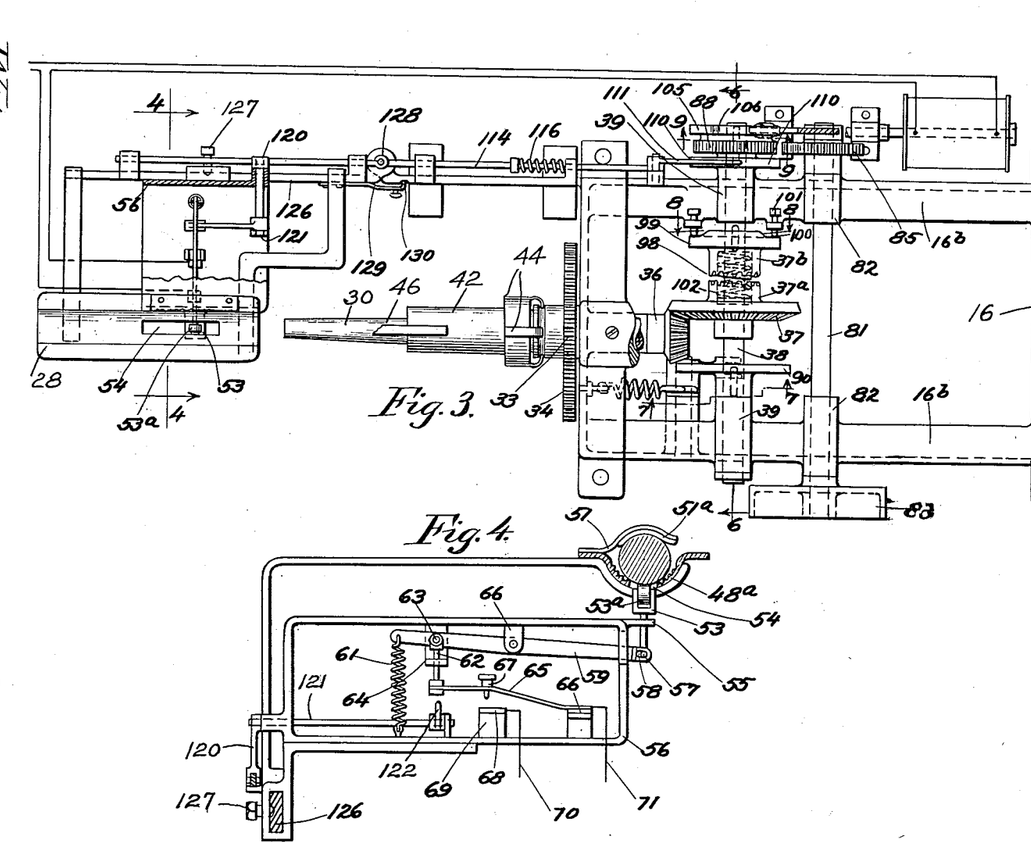
Fig. 3 shows a top plan view of the machine with certain parts removed.
Fig. 4 shows an enlarged transverse vertical section, taken on the line 4—4 of Fig. 3.
Figure 5:
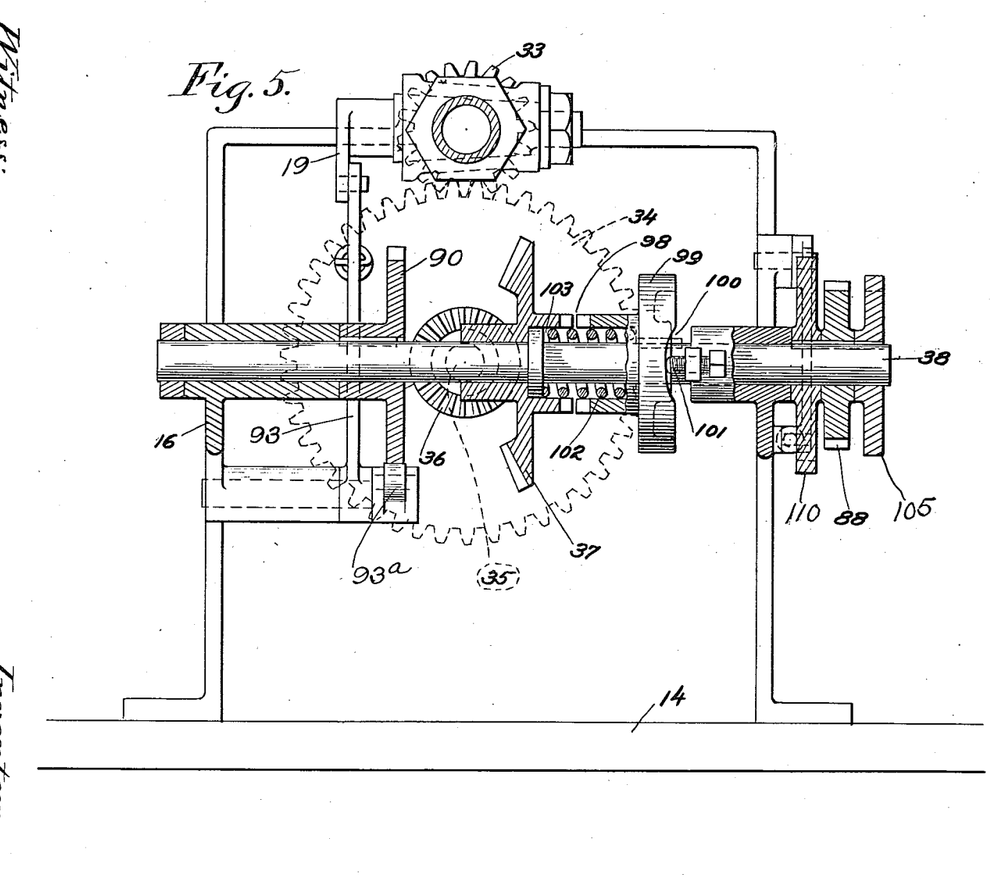
Fig. 5 shows an enlarged vertical section through the cam shaft and associated parts, taken on the line 5—5 of Fig. 3.
Figure 6:
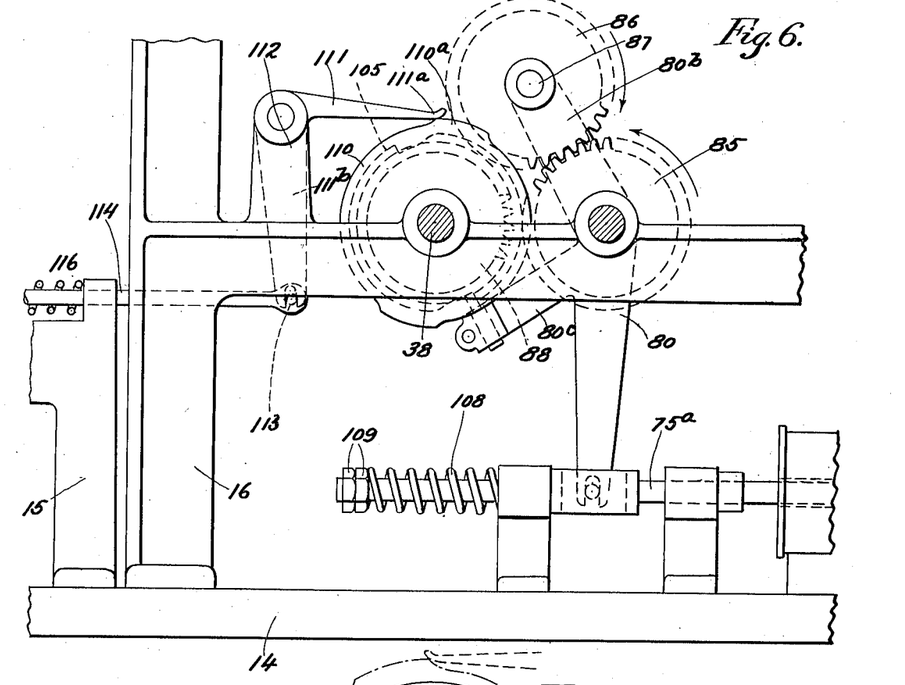
Fig. 6 is an enlarged sectional view taken on the line 6—6 of Fig. 3, showing the means for controlling the actuation of the cam shaft and the means for controlling the link-measuring device.

The relative positions of the cams on the shaft 38 may be seen by reference to Figs. 1 and 6, and particularly Fig. 8. The roller 92 engages one of the depressions 90 at the same time that the pin 107 engages one of the notches 106 in the cam 105, and at this instant also the end 111ª of the lever 111 is just beginning to ride upon one of the projections 110ª of the cam 110, these projections being of sufficient length to hold the lever 120 out of engagement with the contact spring 65 during an interval of time adapted to permit the operation of the measuring finger 53, the consequent operation of the solenoid 73, and the following rotation of the shaft 38, which causes the roller 92 and the pin 107 to move out of notches 92 and 106, respectively.

When the sausage casing 41 on the tube 30 has all been filled, a new casing may be placed on the tube, as previously described, and the operation of the machine continued. It will be apparent that all of the sausage links formed by the machine are of the same length, and that the separation between adjacent links is formed by the twirling of an unfilled portion of the casing with respect to the part of the casing which has just been filled, so that there is always sufficient slack in the casing to permit the twirling to take place without tearing the casing or otherwise injuring it, while at the same time the novel means herein provided for permitting the casing to come to rest before the twirling operation begins prevents the waste of the casing by twisting relatively long sections thereof between adjacent links.

Although I have shown and described a particular embodiment of this invention for purposes of illustration, it will be understood that it may be constructed in various different forms without departing from the spirit of this invention as defined in the appended claims.

What I claim is:

1. In combination, means for holding a casing, means for filling the casing, and means actuated by the filled casing for intermittently arresting the operation of said filling means.

2. In combination, means for holding a casing, means for filling the casing, means controlled by the movement of the filled casing for arresting the operation of the filling means, and means for twirling the unfilled casing with respect to the last section filled after said filling means has been arrested.

3. In combination, means for holding a casing, means for filling the casing, means controlled by the movement of the filled casing for arresting the operation of the filling means, and means actuated by said last-named means for twirling the unfilled casing with respect to the last section filled.

4. In combination, means for holding a casing, means for filling the same with meat, means for intermittently operating said filling means whereby adjacent segments of said casing are filled in succession, and means for automatically controlling the length of each of said segments.

5. In combination, a tube on which the unfilled casing is adapted to be mounted, filling means for filling said casing and forcing the same off of said tube, and means for automatically arresting the operation of said filling means when a predetermined length of said casing has been filled thereby.

6. In combination, a tube, means for feeding meat through said tube, a second tube rotatably mounted around said first-mentioned tube and adapted to hold the unfilled casing, and means actuated by the filled casing for arresting the operation of said feeding means.

7. In combination, a tube, means for feeding meat through said tube, a second tube rotatably mounted around said first-mentioned tube and adapted to hold the unfilled casing, means actuated by the filled casing for arresting the operation of said feeding means, and means operating thereafter for rotating said second-named tube to twist the unfilled casing with respect to the filled casing.

8. In combination, a tube, means for feeding meat through said tube, a second tube rotatably mounted around said first-mentioned tube and adapted to hold the unfilled casing, means actuated by the filled casing for arresting the operation of said feeding means, means operating thereafter for rotating said second-named tube to twist the unfilled casing with respect to the filled casing, and means for automatically delaying the operation of said last-named means until said first-named means has been arrested and said filled casing has come to rest.

9. In combination, a tube, means for feeding meat through said tube, a second tube rotatably mounted around said first-mentioned tube and adapted to hold the unfilled casing, means actuated by the filled casing for arresting the operation of said feeding means, means operating thereafter for rotating said second-named tube to twist the unfilled casing with respect to the filled casing, and means for insuring the stopping of said twisting means before said feeding means continues its operation.

10. In combination, a tube through which meat is adapted to be fed, a second tube rotatably mounted around said first-mentioned tube, said second-named tube being adapted to hold the unfilled sausage casing, means for alternately feeding meat through said first-mentioned tube and rotating said second-mentioned tube, and automatic means for controlling the succession of said operations to produce sausage links of equal lengths.

11. In combination, a tube through which meat is adapted to be fed, a second tube rotatably mounted around said first-named tube and adapted to hold the unfilled sausage casing, means for intermittently feeding meat through said first-named tube to fill successive segments of said casing of substantially equal length, and means acting in alternation with said last-named means for intermittently rotating said second-named tube through predetermined constant arcs.

12. In combination, a tube through which meat is adapted to be fed, a second tube rotatably mounted around said first-named tube and adapted to hold the unfilled sausage casing, means for intermittently feeding meat through said first-named tube to fill successive segments of said casing of substantially equal length, means acting in alternation with said last-named means for intermittently rotating said second-named tube through predetermined constant arcs, and means for insuring the complete stopping of said feeding means before said rotating means begins to operate and for insuring the stopping of said rotating means before said feeding means begins its next succeeding operation.

13. In combination, means for holding an unfilled sausage casing, feeding means acting constantly under pressure for filling said casing, means for rotating the unfilled casing with respect to the filled part thereof to form a constricted portion between adjacent links, and means actuated by coaction with said constricted portion for discontinuing the operation of said filling means when a predetermined segment of casing has been filled.

14. In combination, means for holding an unfilled sausage casing, feeding means acting constantly under pressure for filling said casing, means for rotating the unfilled casing with respect to the filled part thereof to form a constricted portion between adjacent links, a movable member adapted normally to enter a constricted part of said casing when the latter arrives at a predetermined position, and electrically operated means actuated by said movable member when the latter engages said constricted portion for automatically controlling the operation of said filling means to effect the filling of successive segments of casing of substantially equal length.

15. In combination, means for holding an unfilled sausage casing, feeding means for filling said casing, means for twirling said casing to form a constricted portion at the end of each link formed, a movable member adapted to be actuated by engagement with a constricted part of said casing, means actuated by the operation of said movable member for arresting the operation of said feeding means, and means for varying the position of said movable member to regulate the length of casing filled by each operation of said feeding means.

16. In combination, means for holding an unfilled sausage casing, feeding means for filling said casing, means for twirling said casing to form a constricted portion at the end of each link formed, a movable member adapted to be actuated by engagement with a constricted part of said casing, means acting normally to maintain said movable member out of engagement with said casing, means to render said last named means inoperative at the time when a constricted part of said casing reaches a position over said movable member, and means actuated by the engagement of said movable member with a constricted portion of said casing for arresting the operation of said feeding means.

17. In combination, means for holding an unfilled sausage casing, feeding means for filling said casing, means for rotating the unfilled casing with respect to the filled part thereof to form a constricted portion between adjacent links, a movable member adapted to enter a constricted part of said casing when the latter arrives at a predetermined position, electrically operated means actuated by the engagement of said movable member with said constricted part for arresting the operation of said feeding means, and beginning the operation of said rotating means, means for arresting the operation of said electrically operated means after said rotating means has begun to operate, and means for restoring the operation of said feeding means after a predetermined operation of said rotating means.

18. In combination, means for holding an unfilled sausage casing, feeding means for filling said casing, means for rotating the unfilled casing with respect to the filled part thereof to form a constricted portion at the end of each segment filled, cam actuated means controlled by the operation of said feeding means for arresting the operation of the latter when a predetermined length of casing has been filled, cam controlled means for actuating said rotated means thereafter, and cam controlled means for delaying the operation of said last named means for a predetermined period after said first mentioned cam actuated means has begun to operate.

19. In combination, means for holding an unfilled sausage casing, feeding means for filling said casing, means for rotating the unfilled casing with respect to the filled part thereof to form a constricted portion at the end of each segment filled, cam actuated means controlled by the operation of said feeding means for arresting the operation of the latter when a predetermined length of casing has been filled, cam controlled means for actuating said rotating means thereafter, cam controlled means for delaying the operation of said last named means for a predetermined period after said first mentioned cam actuated means has begun to operate, and other cam controlled means for insuring the instantaneous stopping of said rotating means after a predetermined operation of the latter.

20. In combination, means for holding an unfilled sausage casing, feeding means for filling said casing, means for rotating the unfilled casing with respect to the filled part thereof to form a constricted portion at the end of each segment filled, a continuously operating driving shaft, a controlling shaft adapted to be operated thereby, means actuated upon movement of said controlling shaft for arresting the operation of said feeding means, means actuated by coaction with a constricted part of said casing for forming a driving connection between said shafts and thereby arresting the operation of said feeding means, and other means actuated by said controlling shaft for operating said rotating means when said feeding means is idle.

21. In combination, means for holding an unfilled sausage casing, feeding means for filling said casing, means for rotating the unfilled casing with respect to the filled part thereof to form a constricted portion at the end of each segment filled, a continuously operating driving shaft, a controlling shaft adapted to be operated thereby, means actuated upon movement of said controlling shaft for arresting the operation of said feeding means, means actuated by coaction with a constricted part of said casing for forming a driving connection between said shafts and thereby arresting the operation of said feeding means, means adapted to be actuated by said controlling shaft for operating said rotating means, and means actuated after a predetermined movement of said controlling shaft for effecting the operation of said last-named means.

22. In combination, means for holding an unfilled sausage casing, feeding means for filling said casing, means for rotating the unfilled casing with respect to the filled part thereof to form a constricted portion at the end of each segment filled, a continuously operating driving shaft, a controlling shaft adapted to be operated thereby, means actuated upon movement of said controlling shaft for arresting the operation of said feeding means, means actuated by coaction with a constricted part of said casing for forming a driving connection between said shafts and thereby arresting the operation of said feeding means, means adapted to be actuated by said controlling shaft for operating said rotating means, and means actuated after a predetermined movement of said controlling shaft for effecting the operation of said last named means, all of said means operated by said controlling shaft being arranged to effect the alternate operation of said feeding means and said rotating means in a continuous cycle.

23. In combination, means for filling a casing, and means for intermittently arresting the operation of said filling means at intervals determined by the length of the segment of casing filled during one operation of said filling means.

24. In combination, means for filling a casing, means for intermittently arresting the operation of said filling means at intervals determined by the length of the segment of casing filled during one operation of said filling means, and means for varying the length of the segment of casing filled during each operation of said filling means.

25. In combination, means for holding a casing, means for filling the casing, and electrically controlled means for intermittently arresting the operation of said filling means.

26. In combination, means for holding and filling a casing, means for intermittently arresting the operation of said filling means, means for twirling the unfilled casing with respect to the last segment of casing filled, and means for delaying the operation of said twirling means until said filling means has been arrested and said filled casing has come to rest.

27. In combination, a tube, means for feeding meat through said tube, means for holding a casing to receive meat from said tube, and means independent of said tube for twirling the unfilled casing with respect to the filled casing.

28. The combination in a machine of the class described, of a tube adapted to engage and hold an unfilled casing, means for feeding meat though the interior of said tube into said casing, and means mounted outwardly of said tube for controlling the movement of said casing from said tube.

29. In combination, a tube, means for feeding meat through said tube, a second tube within which said first-named tube is mounted, said second-named tube being adapted to enter and hold an unfilled sausage casing, and means for rotating said second-named tube with respect to said first-named tube.

30. In combination, means for holding a casing, means for feeding meat into said casing, means for arresting the operation of said feeding means, means for twirling said casing when the operation of said feeding means is arrested, and means comprising a member adapted to engage the depressions between adjacent links for controlling the operation of said arresting means.

31. In combination, means for holding a casing, means for feeding meat into said casing, means for arresting the operation of said feeding means, means for twirling said casing when the operation of said feeding means is arrested, means comprising a member adapted to engage the depressions between adjacent links for controlling the operation of said arresting means, and means for moving said member out of operative position.

In testimony whereof, I have subscribed my name.

LOUIS REISFELD.